United States Patent
Farah et al.

(10) Patent No.: US 9,920,641 B2
(45) Date of Patent: Mar. 20, 2018

(54) GAS TURBINE ENGINE MID-TURBINE FRAME CONFIGURATION

(71) Applicant: United Technologies Corporation, Hartford, CT (US)

(72) Inventors: Jorge I. Farah, Hartford, CT (US); John T. Ols, Northborough, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 343 days.

(21) Appl. No.: 14/629,090

(22) Filed: Feb. 23, 2015

(65) Prior Publication Data

US 2016/0245105 A1    Aug. 25, 2016

(51) Int. Cl.
    *F01D 9/04*     (2006.01)
    *F01D 25/16*    (2006.01)
    (Continued)

(52) U.S. Cl.
    CPC ............. *F01D 9/041* (2013.01); *F01D 9/042* (2013.01); *F01D 11/005* (2013.01);
    (Continued)

(58) Field of Classification Search
    CPC ........ F01D 9/041; F01D 9/042; F01D 11/005; F01D 25/24; F01D 25/162; F01D 25/28;
    (Continued)

(56) References Cited

U.S. PATENT DOCUMENTS 3,902,314 A * 9/1975 Straniti .................... F02C 7/20
                                                      60/796
4,987,736 A * 1/1991 Ciokajlo ................. F01D 9/065
                                                      415/138
(Continued)

FOREIGN PATENT DOCUMENTS

EP          1921253          5/2008
WO       2006038842          4/2006
(Continued)

OTHER PUBLICATIONS

Extended European Search Report for European Application No. 16156096.6 dated Jul. 15, 2016.
(Continued)

*Primary Examiner* — Justin Seabe
*Assistant Examiner* — Juan G Flores
(74) *Attorney, Agent, or Firm* — Carlson, Gaskey & Olds, P.C.

(57) ABSTRACT

A gas turbine engine includes a core flow path that extends axially about an engine axis. A turbine section is arranged in the core flow path. A mid-turbine frame includes multiple circumferentially spaced vanes that extend radially between and interconnect inner and outer flow path surfaces that define a portion of the core flow path. The vanes and inner and outer flow path surfaces are provided by a unitary, one-piece cast structure. The inner flow path surface provides inlet and exit inner diameters relative to the engine axis. The outer flow path surface provides inlet and exit outer diameters relative to the engine axis. The inner flow
(Continued)

path surface extends an axial length from the inlet inner diameter to the exit inner diameter. A ratio of the exit outer diameter to the axial length is greater than 3.0 to 1.

20 Claims, 3 Drawing Sheets

(51) Int. Cl.
*F01D 25/24* (2006.01)
*F01D 25/28* (2006.01)
*F01D 11/00* (2006.01)
F01D 9/06 (2006.01)
F02C 7/20 (2006.01)

(52) U.S. Cl.
CPC .......... *F01D 25/162* (2013.01); *F01D 25/24* (2013.01); *F01D 25/28* (2013.01); *F01D 9/065* (2013.01); *F02C 7/20* (2013.01); *F05D 2220/3213* (2013.01); *F05D 2230/21* (2013.01); *F05D 2240/12* (2013.01); *F05D 2240/55* (2013.01); *F05D 2240/80* (2013.01); *F05D 2260/31* (2013.01)

(58) Field of Classification Search
CPC .... F01D 9/065; F02C 7/20; F05D 2220/3213; F05D 2230/21; F05D 2240/55; F05D 2260/31
USPC ........................................................ 415/136
See application file for complete search history.

(56) References Cited

U.S. PATENT DOCUMENTS

| 5,160,251 | A | 11/1992 | Ciokajlo |
| 7,870,719 | B2 * | 1/2011 | Lee .......................... F01D 5/143 |
| | | | 313/362.1 |
| 8,061,969 | B2 | 11/2011 | Durocher et al. |
| 8,347,500 | B2 | 1/2013 | Durocher et al. |
| 8,500,392 | B2 | 8/2013 | Durocher et al. |
| 8,561,414 | B1 * | 10/2013 | Praisner .................... F01D 9/04 |
| | | | 415/191 |
| 2010/0132377 | A1 | 6/2010 | Durocher et al. |
| 2014/0204608 | A1 | 7/2014 | Park et al. |
| 2015/0009418 | A1 | 1/2015 | Fujine et al. |

FOREIGN PATENT DOCUMENTS

| WO | 2014105577 | 7/2014 |
| WO | 2014171994 | 10/2014 |
| WO | 2014210496 | 12/2014 |
| WO | 20140200673 | 12/2014 |
| WO | 20140204608 | 12/2014 |
| WO | 20150009418 | 1/2015 |

OTHER PUBLICATIONS

PCT Application No. PCT/US2014/056709 filed Sep. 22, 2014 titled Turbine Vane With Plaform Rib.
PCT Application No. PCT/US2014/038723 filed May 20, 2014 titled Turbine Vane With Non-Uniform Wall Thickness.

* cited by examiner

GAS TURBINE ENGINE MID-TURBINE FRAME CONFIGURATION

BACKGROUND

The present disclosure relates to a gas turbine engine and, more particularly, to a mid-turbine frame.

A mid-turbine frame (MTF) of a gas turbine engine typically includes a plurality of hollow vanes arranged in a ring-vane-ring structure. The rings define inner and outer boundaries of a core gas path while the vanes are disposed across the gas path. Tie rods extend through the hollow vanes to interconnect an engine mount ring and a bearing compartment. The tie rods transfer loads from a bearing compartment to an outer case structure while permitting the MTF to float.

The MTF is a typically constructed from multiple arcuate segments brazed to one another to provide a full ring. One engine application has used a one-piece cast MTF, however, this application carries the load of the bearing compartment via a bolted joint to the outer case structure. The MTF has a shallow cone angle of 15°, which more efficiently transfers the load through the MTF. The MTF includes an inner flow path surface providing inlet and exit inner diameters relative to the engine axis that provide an axial length. An outer flow path surface provides an exit outer diameter relative to the engine axis. A ratio of an exit outer diameter to the axial length of 2.6 to 1, which provides a compact design suitable for loading the MTF.

The MTF is subject to thermal stresses from combustion gases along the core gas path, which may reduce operational life thereof. The MTF with bolted joint has actively cooled vanes that include serpentine cooling passages provided cooling fluid from a bleed source.

The different load paths and cooling approaches in MTF applications provide unique design challenges.

SUMMARY

In one exemplary embodiment, a gas turbine engine includes a core flow path that extends axially about an engine axis. A turbine section is arranged in the core flow path. The turbine section includes a high pressure turbine and a low pressure turbine that is arranged downstream from the high pressure turbine. A mid-turbine frame is arranged in the core flow path between the high and low pressure turbines. The mid-turbine frame includes multiple circumferentially spaced vanes that extend radially between and interconnect inner and outer flow path surfaces that define a portion of the core flow path. The vanes and inner and outer flow path surfaces are provided by a unitary, one-piece cast structure. The inner flow path surface provides inlet and exit inner diameters relative to the engine axis. The outer flow path surface provides inlet and exit outer diameters relative to the engine axis. The inner flow path surface extends an axial length from the inlet inner diameter to the exit inner diameter. A ratio of the exit outer diameter to the axial length is greater than 3.0 to 1.

In a further embodiment of the above, a mid-turbine frame module includes inner and outer cases. The mid-turbine frame is arranged radially between the inner and outer cases. Tie rods extend through the vanes and are secured to the inner and outer cases. The mid-turbine frame is configured to float relative to the inner and outer cases.

In a further embodiment of any of the above, a bearing compartment is mounted to the inner case.

In a further embodiment of any of the above, the outer case supports multiple circumferentially spaced centering pins that engage corresponding bosses on the mid-turbine frame. The mid-turbine frame is configured to float relative centering pins.

In a further embodiment of any of the above, the ratio is 3.0-4.5 to 1.

In a further embodiment of any of the above, the ratio is 3.5-4.0 to 1.

In a further embodiment of any of the above, the ratio is 3.6-3.9 to 1.

In a further embodiment of any of the above, the mid-turbine frame includes an outer platform that provides the outer flow path surface. First and second seals are mounted on the outer platform opposite the outer flow path surface and engage the outer case.

In a further embodiment of any of the above, the mid-turbine frame includes an inner platform that provides the inner flow path surface. Third and fourth seals are mounted on the inner platform opposite the inner flow path surface and engage the inner case.

In a further embodiment of any of the above, the inner flow path surface and the engine axis are at an angle of 20°-35°.

In another exemplary embodiment, a mid-turbine frame module includes inner and outer cases arranged about an engine axis. A mid-turbine frame is arranged radially between the inner and outer cases. The mid-turbine frame includes multiple circumferentially spaced vanes that extend radially between and interconnect inner and outer flow path surfaces that define a portion of a core flow path. The vanes and inner and outer flow path surfaces are provided by a unitary, one-piece cast structure. Tie rods extend through the vanes and are secured to the inner and outer cases. The mid-turbine frame is configured to float relative to the inner and outer cases about an engine axis. Multiple circumferentially spaced centering pins are supported by the outer case and engage corresponding bosses on the mid-turbine frame. The mid-turbine frame is configured to float relative centering pins. The inner flow path surface provides inlet and exit inner diameters relative to the engine axis. The outer flow path surface provides inlet and exit outer diameters relative to the engine axis. The inner flow path surface extends an axial length from the inlet inner diameter to the exit inner diameter. A ratio of the exit outer diameter to the axial length is greater than 3.0 to 1.

In a further embodiment of any of the above, the ratio is 3.0-4.5 to 1.

In a further embodiment of any of the above, the ratio is 3.5-4.0 to 1.

In a further embodiment of any of the above, the ratio is 3.6-3.9 to 1.

In a further embodiment of any of the above, the inner flow path surface and the engine axis are at an angle of 20°-35°.

In another exemplary embodiment, a mid-turbine frame includes a mid-turbine frame that is arranged about an engine axis. The mid-turbine frame includes multiple circumferentially spaced vanes that extend radially between and interconnect inner and outer flow path surfaces that define a portion of a core flow path. The vanes and inner and outer flow path surfaces are provided by a unitary, one-piece cast structure. The inner flow path surface provides inlet and exit inner diameters relative to the engine axis. The outer flow path surface provides inlet and exit outer diameters relative to the engine axis. The inner flow path surface extends an axial length from the inlet inner diameter to the exit inner diameter. A ratio of the exit outer diameter to the axial length is greater than 3.0 to 1.

In a further embodiment of any of the above, the ratio is 3.0-4.5 to 1.

In a further embodiment of any of the above, the ratio is 3.5-4.0 to 1.

In a further embodiment of any of the above, the ratio is 3.6-3.9 to 1.

In a further embodiment of any of the above, the inner flow path surface and the engine axis are at an angle of 20°-35°.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
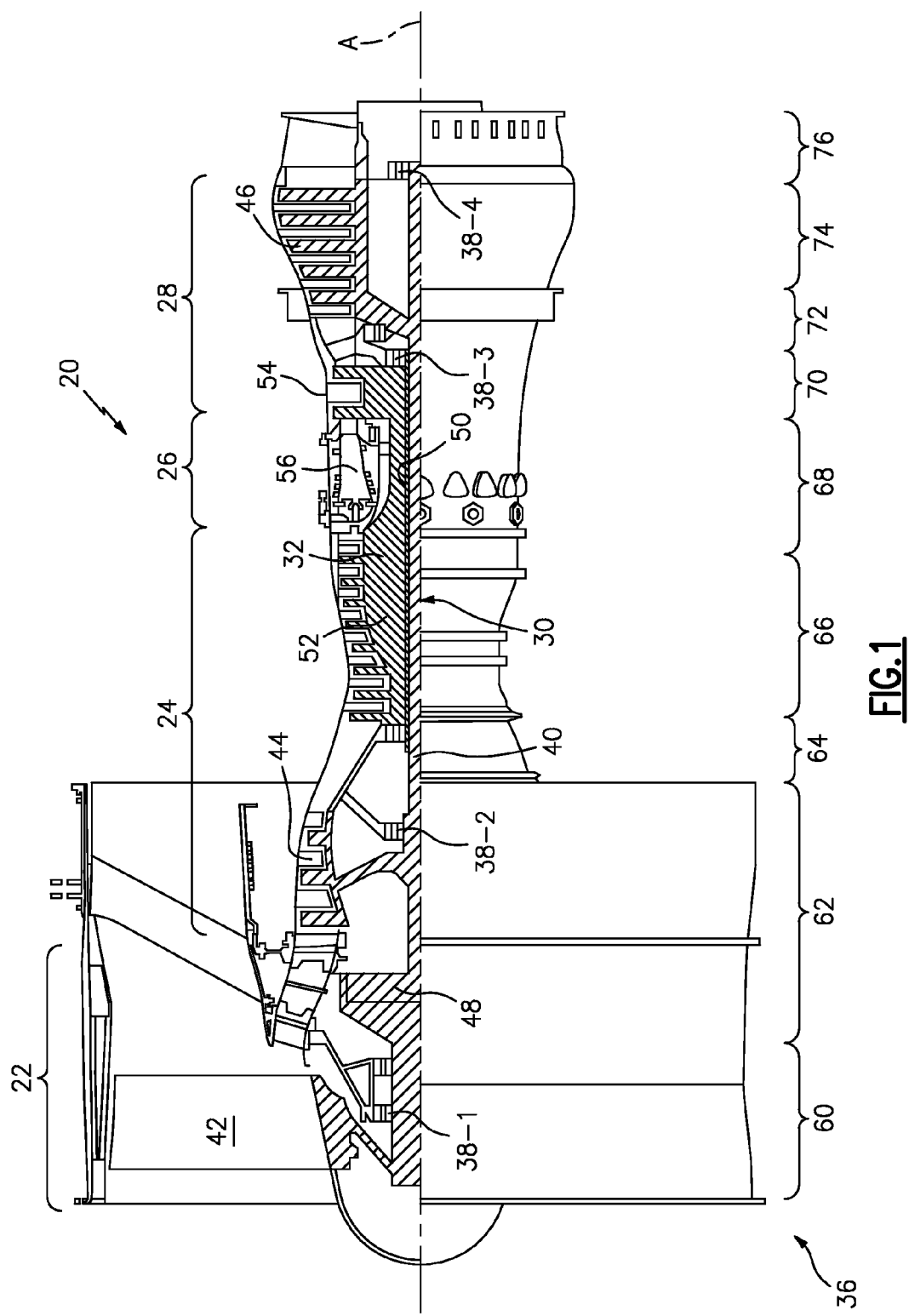
FIG. 1 is a schematic cross-sectional view of a geared architecture gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines architectures such as a low-bypass turbofan may include an augmentor section (not shown) among other systems or features. Although schematically illustrated as a turbofan in the disclosed non-limiting embodiment, it should be understood that the concepts described herein are not limited to use with turbofans as the teachings may be applied to other types of turbine engines to include but not limited to a three-spool (plus fan) engine wherein an intermediate spool includes an intermediate pressure compressor (IPC) between a low pressure compressor and a high pressure compressor with an intermediate pressure turbine (IPT) between a high pressure turbine and a low pressure turbine as well as other engine architectures such as turbojets, turboshafts, open rotors and industrial gas turbines.

The fan section 22 drives air along a bypass flowpath and a core flowpath while the compressor section 24 drives air along the core flowpath for compression and communication into the combustor section 26, and subsequent expansion through the turbine section 28. The engine 20 generally includes a low-speed spool 30 and a high-speed spool 32 mounted for rotation about an engine central longitudinal axis A relative to an engine case assembly 36 via several bearing compartments 38-1, 38-2, 38-3, 38-4. The bearing compartments 38-1, 38-2, 38-3, 38-4 in the disclosed non-limiting embodiment are defined herein as a forward bearing compartment 38-1, a mid-bearing compartment 38-2 axially aft of the forward bearing compartment 38-1, a mid-turbine bearing compartment 38-3 axially aft of the mid-bearing compartment 38-2 and a rear bearing compartment 38-4 axially aft of the mid-turbine bearing compartment 38-3. It should be appreciated that additional or alternative bearing compartments may be provided.

The low spool 30 generally includes an inner shaft 40 that interconnects a fan 42, a low-pressure compressor 44 ("LPC") and a low-pressure turbine 46 ("LPT"). The inner shaft 40 drives the fan 42 through a geared architecture 48 to drive the fan 42 at a lower speed than the low spool 30. The high spool 32 includes an outer shaft 50 that interconnects a high-pressure compressor 52 ("HPC") and high-pressure turbine 54 ("HPT"). A combustor 56 is arranged between the HPC 52 and the HPT 54. The inner shaft 40 and the outer shaft 50 are concentric and rotate about the engine central longitudinal axis A, which is collinear with longitudinal axes of inner and outer shafts 40, 50.

Core airflow is compressed by the LPC 44 then the HPC 52, mixed with the fuel and burned in the combustor 56, then expanded over the HPT 54 and the LPT 46. The HPT 54 and the LPT 46 drive the respective high spool 32 and low spool 30 in response to the expansion.

In one example, the gas turbine engine 20 is a high-bypass geared architecture engine in which the bypass ratio is greater than about six (6:1). The geared architecture 48 can include an epicyclic gear system, such as a planetary gear system, star gear system or other system. The example epicyclic gear train has a gear reduction ratio of greater than about 2.3, and in another example is greater than about 2.5 with a gear system efficiency greater than approximately 98%. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one example, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of embodiments of a geared architecture engine, and that the present disclosure is applicable to other gas turbine engines, including, for example, direct drive turbofans.

A significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$. The Low Corrected Fan Tip Speed according to one non-limiting embodiment of the example gas turbine engine 20 is less than about 1150 fps (351 m/s).

The engine case assembly 36 generally includes a plurality of modules, including a fan case module 60, an intermediate case module 62, a Low Pressure Compressor (LPC) module 64, a High Pressure Compressor (HPC) module 66, a diffuser module 68, a High Pressure Turbine (HPT)

module 70, a mid-turbine frame (MTF) module 72, a Low Pressure Turbine (LPT) module 74, and a Turbine Exhaust Case (TEC) module 76. It should be understood that additional or alternative modules might be utilized to form the engine case assembly 36.

Figure 2:
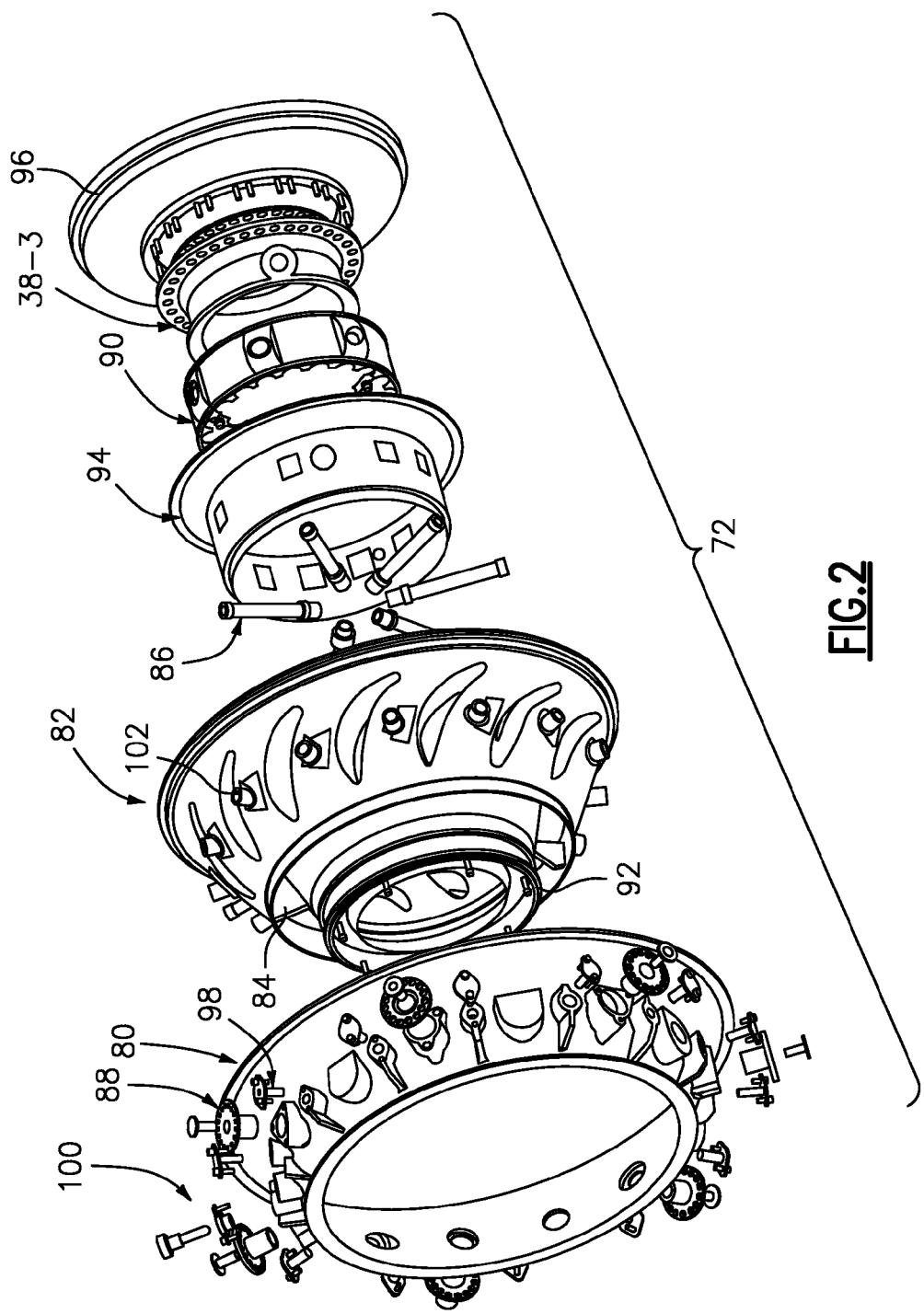
FIG. 2 is an exploded view of a mid-turbine frame module.

With reference to FIG. 2, the MTF module 72 generally includes an outer turbine case 80, a mid-turbine frame (MTF) 82 which defines a plurality of hollow vanes 84, a plurality of tie rods 86, multiple of tie rod nuts 88, an inner case 90, a HPT seal 92, a heat shield 94, a LPT seal 96, multiple of centering pins 98 and a borescope plug assembly 100. The MTF module 72 supports the mid-bearing compartment 38-3 through which the inner and outer shafts 40, 50 are rotationally supported. However, the mid-turbine frame 82 itself is not loaded by the bearing compartment 38-3. It should be appreciated that various other components may additionally or alternatively be provided within the MTF 82, for example only, the LPT seal 96 may alternatively be referred to as an intermediate seal in other engine architectures.

Each of the tie rods 86 are mounted to the inner case 90 and extend through a respective vane 84 to be fastened to the outer turbine case 80 with the multiple of tie rod nuts 88. That is, each tie rod 86 is typically sheathed by a vane 84 through which the tie rod 86 passes (FIG. 3), and the MTF 82 is permitted to float relative to the inner and outer cases 90, 80. The other vanes 84 may alternatively or additionally provide other service paths. The multiple of centering pins 98 are circumferentially distributed between the vanes 84 to engage bosses 102 on the MTF 82 to locate the MTF 82 with respect to the inner case 90 and the outer turbine case 80. It should be understood that various attachment arrangements may alternatively or additionally be utilized.

Figure 3:
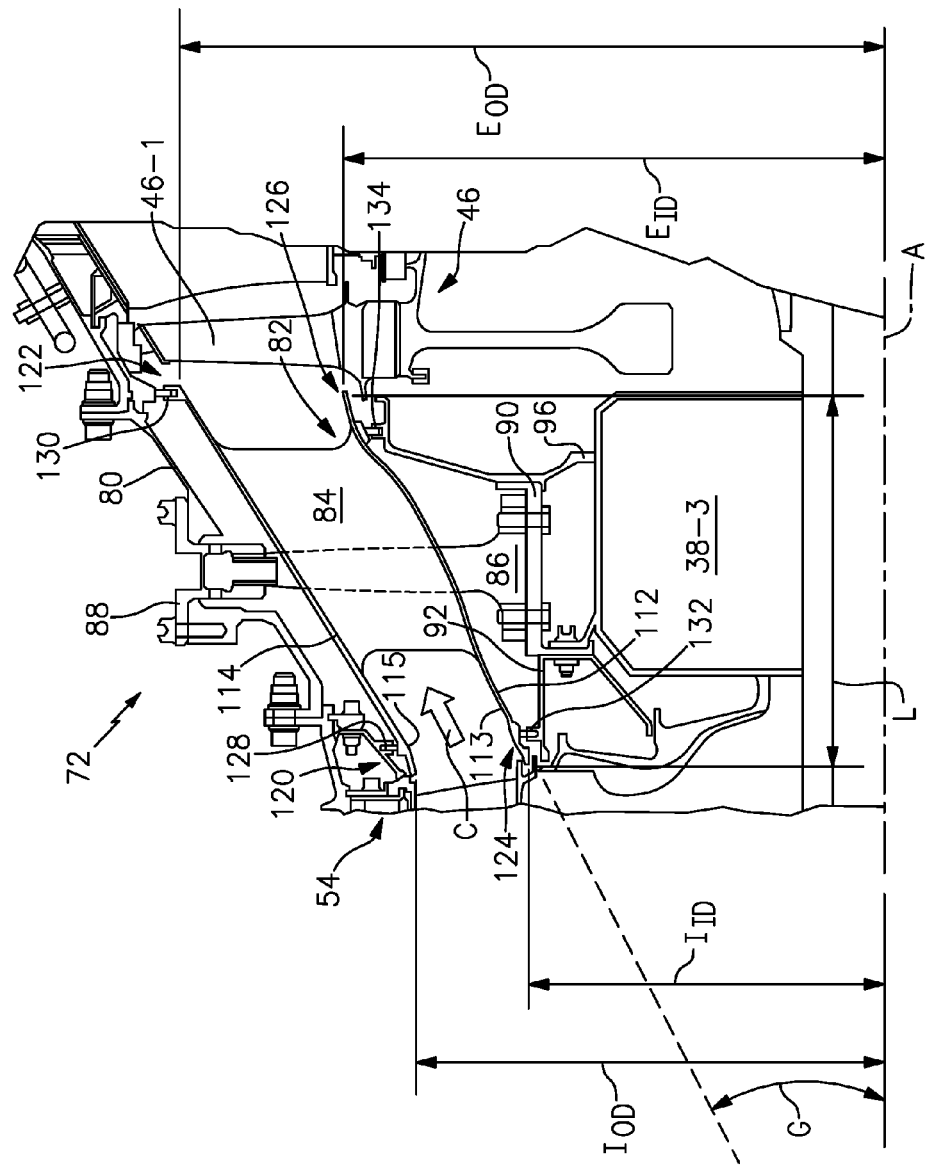
FIG. 3 is a cross-sectional view of the mid-turbine frame module through a vane.

With reference to FIG. 3, the MTF 82 is arranged in the core flow path between the high and low pressure turbines 54, 46. The vanes 84 interconnect inner and outer platforms 112, 114 that respectively include inner and outer flow path surfaces 113, 115, which define a portion of the core flow path. The MTF 82 in one disclosed non-limiting embodiment is cast as a unitary, one-piece component such that the vanes 84 and inner and outer flow path surfaces 113, 115 are provided by a unitary, one-piece cast structure. The inner flow path surface 113 and the engine axis A are at an angle G of 20°-35° in the example embodiment. The MTF 82 may be cast from a high temperature nickel alloy or other suitable material.

The inner flow path surface 113 provides inlet and exit inner diameters $I_{ID}$, $E_{ID}$ relative to the engine axis A. The outer flow path surface 115 provides inlet and exit outer diameters $I_{OD}$, $E_{OD}$ relative to the engine axis A. The inner flow path surface 113 extends an axial length L from the inlet inner diameter $I_{ID}$ to the exit inner diameter $E_{ID}$.

A ratio of the exit outer diameter $E_{OD}$ to the axial length L ($E_{OD}$/L) greater than 3.0 to 1. In one example, the ratio ($E_{OD}$/L) is 3.0-4.5 to 1. In another example, the ratio ($E_{OD}$/L) is 3.5-4.0 to 1, and in still another example, the ratio ($E_{OD}$/L) is 3.6-3.9 to 1.

The MTF 82 is sealed to the outer turbine case 80 at an outer forward seal interface 120 and an outer aft seal interface 122. The MTF 82 is also sealed to the LPT seal 96, which is attached to the inner case 90 at an inner forward seal interface 124 and an inner aft seal interface 126. Each seal interface 120, 122, 124, 126 includes a seal 128, 130, 132, 134 mounted to the inner and outer platforms 112, 114 such as a ring seal, W-seal, C-seal or other seal to seal the MTF 82 relative to the inner and outer cases 90, 80 from a secondary airflow.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine comprising:
   a core flow path extending axially about an engine axis;
   a turbine section that is arranged in the core flow path, the turbine section includes a high pressure turbine and a low pressure turbine that is arranged downstream from the high pressure turbine;
   a mid-turbine frame arranged in the core flow path between the high and low pressure turbines, the mid-turbine frame includes multiple circumferentially spaced vanes that extend radially between and interconnect inner and outer flow path surfaces that define a portion of the core flow path, the vanes and inner and outer flow path surfaces provided by a unitary, one-piece cast structure, the inner flow path surface provides inlet and exit inner diameters relative to the engine axis, and the outer flow path surface provides inlet and exit outer diameters relative to the engine axis, the inner flow path surface extends an axial length from the inlet inner diameter to the exit inner diameter; and
   a ratio of the exit outer diameter to the axial length greater than 3.0 to 1.

2. The gas turbine engine according to claim 1, comprising a mid-turbine frame module that includes inner and outer cases, the mid-turbine frame arranged radially between the inner and outer cases, tie rods extending through the vanes and secured to the inner and outer cases, the mid-turbine frame configured to float relative to the inner and outer cases.

3. The gas turbine engine according to claim 2, comprising a bearing compartment mounted to the inner case.

4. The gas turbine engine according to claim 2, wherein the outer case supports multiple circumferentially spaced centering pins that engage corresponding bosses on the mid-turbine frame, the mid-turbine frame configured to float relative centering pins.

5. The gas turbine engine according to claim 2, wherein the mid-turbine frame includes an outer platform that provides the outer flow path surface, first and second seals mounted on the outer platform opposite the outer flow path surface and engaging the outer case.

6. The gas turbine engine according to claim 2, wherein the mid-turbine frame includes an inner platform that provides the inner flow path surface, third and fourth seals mounted on the inner platform opposite the inner flow path surface and engaging the inner case.

7. The gas turbine engine according to claim 1, wherein the ratio is 3.0-4.5 to 1.

8. The gas turbine engine according to claim 7, wherein the ratio is 3.5-4.0 to 1.

9. The gas turbine engine according to claim 8, wherein the ratio is 3.6-3.9 to 1.

10. The gas turbine engine according to claim 1, wherein the inner flow path surface and the engine axis are at an angle of 20°-35°.

11. A mid-turbine frame module comprising:
inner and outer cases arranged about an engine axis;
a mid-turbine frame arranged radially between the inner and outer cases, the mid-turbine frame includes multiple circumferentially spaced vanes that extend radially between and interconnect inner and outer flow path surfaces that define a portion of a core flow path, the vanes and inner and outer flow path surfaces provided by a unitary, one-piece cast structure;
tie rods extending through the vanes and secured to the inner and outer cases, the mid-turbine frame configured to float relative to the inner and outer cases about an engine axis;
multiple circumferentially spaced centering pins supported by the outer case and that engage corresponding bosses on the mid-turbine frame, the mid-turbine frame configured to float relative centering pins; and
the inner flow path surface provides inlet and exit inner diameters relative to the engine axis, and the outer flow path surface provides inlet and exit outer diameters relative to the engine axis, the inner flow path surface extends an axial length from the inlet inner diameter to the exit inner diameter, a ratio of the exit outer diameter to the axial length greater than 3.0 to 1.

12. The mid-turbine frame module according to claim 11, wherein the ratio is 3.0-4.5 to 1.

13. The mid-turbine frame module according to claim 12, wherein the ratio is 3.5-4.0 to 1.

14. The mid-turbine frame module according to claim 13, wherein the ratio is 3.6-3.9 to 1.

15. The mid-turbine frame module according to claim 11, wherein the inner flow path surface and the engine axis are at an angle of 20°-35°.

16. A mid-turbine frame comprising:
a mid-turbine frame arranged about an engine axis, the mid-turbine frame includes multiple circumferentially spaced vanes that extend radially between and interconnect inner and outer flow path surfaces that define a portion of a core flow path, the vanes and inner and outer flow path surfaces provided by a unitary, one-piece cast structure; and
the inner flow path surface provides inlet and exit inner diameters relative to the engine axis, and the outer flow path surface provides inlet and exit outer diameters relative to the engine axis, the inner flow path surface extends an axial length from the inlet inner diameter to the exit inner diameter, a ratio of the exit outer diameter to the axial length greater than 3.0 to 1.

17. The mid-turbine frame according to claim 16, wherein the ratio is 3.0-4.5 to 1.

18. The mid-turbine frame according to claim 17, wherein the ratio is 3.5-4.0 to 1.

19. The mid-turbine frame according to claim 18, wherein the ratio is 3.6-3.9 to 1.

20. The mid-turbine frame according to claim 16, wherein the inner flow path surface and the engine axis are at an angle of 20°-35°.

* * * * *